(12) United States Patent
Obara et al.

(10) Patent No.: US 6,895,417 B2
(45) Date of Patent: May 17, 2005

(54) DATABASE DUPLICATION METHOD OF USING REMOTE COPY AND DATABASE DUPLICATION STORAGE SUBSYSTEM THEREOF

(75) Inventors: Kiyohiro Obara, Hachioji (JP); Yoshifumi Takamoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/356,508

(22) Filed: Feb. 3, 2003

(65) Prior Publication Data

US 2003/0115224 A1 Jun. 19, 2003

Related U.S. Application Data

(63) Continuation of application No. 09/585,281, filed on Jun. 2, 2000, now Pat. No. 6,549,920.

(30) Foreign Application Priority Data

Jun. 3, 1999 (JP) .......................................... 11-156561

(51) Int. Cl.[7] .............................................. G06F 17/30
(52) U.S. Cl. ....................................... 707/204; 707/202
(58) Field of Search ................................ 707/6, 10, 20, 707/100, 202, 204; 705/404; 709/106, 213, 249; 711/29, 162; 714/20

(56) References Cited

U.S. PATENT DOCUMENTS

| | | | |
|---|---|---|---|
| 5,890,156 A | | 3/1999 | Rekieta et al. ................. 707/10 |
| 6,081,875 A | * | 6/2000 | Clifton et al. .............. 711/162 |
| 6,199,074 B1 | | 3/2001 | Kern et al. .................. 707/200 |
| 6,549,920 B1 | * | 4/2003 | Obara et al. ................. 707/204 |
| 2002/0016786 A1 | | 2/2002 | Pitkow et al. .................. 707/3 |
| 2002/0123988 A1 | | 9/2002 | Dean et al. ..................... 707/3 |

FOREIGN PATENT DOCUMENTS

JP            10269030            10/1998

* cited by examiner

*Primary Examiner*—Diane D. Mitrahi
*Assistant Examiner*—Apu M Mofiz
(74) *Attorney, Agent, or Firm*—Antonelli, Terry, Stout & Kraus, LLP (57) ABSTRACT

A Database Management System (DBMS) of a main host system is directed by its agent to overwrite database table data (DB table data), which is stored in a DB buffer and put in and out by the DBMS, to the database table (DB table) on a main disk unit, and holds the updating of the DB table data in the DB table against a subsequent request of updating. A main disk control unit is directed by the agent to transfer the DB table data in the DB table to a DB table on a subordinate disk unit by a subordinate disk control unit to duplicate the DB table data, and suspend the subsequent transfer of DB table data so that the DB table data on both disk units are in a state of matching, thereby enabling the DBMS of the subordinate host system to refer to the copied DB table.

9 Claims, 8 Drawing Sheets

| Volume Number | Cylinder Number | Head Number | Record Number |
|---|---|---|---|
| 0 | 1 | 1 | 1 |
| 0 | 1 | 1 | 2 |
| 0 | 1 | 1 | 3 |
| 0 | 5 | 1 | 1 |
| 0 | 6 | 1 | 1 |
| 1 | 1 | 2 | 1 |
| 1 | 2 | 3 | 1 |
| 1 | 3 | 4 | 1 |

⋮

DATABASE DUPLICATION METHOD OF USING REMOTE COPY AND DATABASE DUPLICATION STORAGE SUBSYSTEM THEREOF

This is a continuation of application Ser. No. 09/585,281, filed June 2, 2000, now U.S. Pat. No. 6,549,920.

BACKGROUND OF THE INVENTION

The present invention relates to a data duplication method, and particularly to a data duplication control method for DBMS data and a duplicated storage subsystem for data duplication.

Recently, business data analyzing systems called "data ware house systems" are becoming prevalent. The data ware house is a database management system (DBMS), and it has data of the database by extracting data from the trunk business database in general.

The data ware house system consumes much CPU power for the multi-dimensional analysis of enormous data. On this account, this system is constructed separately from the trunk business system to be capable of communication, with both systems having data communication via the LAN (local area network) or WAN (wide area network).

Generally, loading of data from the trunk business system to the data ware house system takes place in accordance with the following procedure.

(1) Extraction of necessary data by the trunk business DBMS on the part of the trunk business system.

(2) Transfer of the extracted data to the data ware house system by the FTP (file transfer program) or the like.

(3) Loading of the transferred data to the ware house database on the part of the data ware house system.

In the above procedure, the quantity of extracted data transferred in the step (2) can be several tens giga-bytes or more in large business firms. Data transfer, which is generally via the LAN or WAN, is a huge time consumer. Moreover, the LAN or WAN becomes so busy during this data transfer that other users of LAN or WAN are adversely affected.

Data extraction of the step (1) consumes much CPU power of the trunk business system, which deteriorates the CPU response of the inherent trunk business.

These problems of data extraction and transfer seems to be resolved by the prior transfer of trunk business data to the data ware house by use of the automatic data duplication scheme, such as the remote copy function, of the disk system. Specifically, the trunk business database table (DB table) is copied to the data ware house system in advance, so that data is loaded to the data ware house while eliminating the step (2) of the above procedure as follows.

(1) Extraction of necessary data from the copied trunk business DB table data on the part of the data ware house system.

(2) Loading of the extracted data to the ware house database on the part of the data ware house system.

This modified scheme seems good in terms of the reduction of task of the trunk business system by the shift of the data extraction process to the data ware house. However, there arises a new problem in regard to the matching of the DB table data in both systems.

The DBMS incorporates a cache (DB buffer) for holding part of the DB table data. Therefore, updating of the DB table data does not immediately prevail to the DB table data on the disk.

The timing of data updating is arbitrary, at which the DB table data of the disk system in the trunk business system is not necessarily in a state of matching, and accordingly the copied data is not necessarily in a state of matching either.

SUMMARY OF THE INVENTION

With the intention of reducing the data transfer time based on the copying of DB table data by use of the scheme of automatic prior data duplication, such as the remote copy function, of the disk system, instead of the data file transfer by the FTP or the like, it is an object of the present invention to provide a scheme of certifying the matching of copied DB table data of the copy destination. This scheme is capable of not only reducing the data transfer time, but also shifting the data extraction process of the trunk business system to the data ware house system thereby to prevent the deterioration of response of the trunk business system which would arise at the data extraction process.

In order to achieve the above objective, the present invention resides in a data duplication control method for a system which includes a main system having a first processor system in which a first DBMS operates and a first storage subsystem connected to the first processor system and a subordinate system having a second processor system in which a second DBMS operates and a second storage subsystem connected to the second processor system, with the first and second storage subsystems being connected to each other, the method comprising a step, which is implemented by the first DBMS by being directed by the first processor system, of overwriting database table data (will be termed "DB table data") which is stored in a cache and put in and out by the first DBMS to the database table (will be termed "DB table") of the first storage subsystem, and holding the updating of the DB table data in the DB table against a subsequent request of updating of the DB table data, and a step, which is implemented by the first storage subsystem by being directed by the first processor system, of transferring and copying the DB table data of the DB table of the self storage subsystem to the DB table of the second storage subsystem thereby to duplicate the DB table data, and suspending the subsequent transfer of DB table data so that the DB tables of the first and second storage subsystems are in a state of matching, thereby enabling the second DBMS to refer the copied DB table in a state of matching.

The present invention also resides in a data duplication control method for a system which includes a main system having a first processor system in which a first DBMS operates and a first storage subsystem connected to the first processor system and a subordinate system having a second processor system in which a second DBMS operates and a second storage subsystem connected to the second processor system, with the first and second storage subsystems being connected to each other, the method comprising a step, which is implemented by the first DBMS by being directed by the first storage subsystem, of overwriting DB table data which is stored in a cache and put in and out by the first DBMS to the DB table of the first storage subsystem, and holding the updating of the DB table data in the DB table against a subsequent request of updating of the DB table data, and a step, which is implemented by the first storage subsystem, of transferring and copying the DB table data of the DB table of the self storage subsystem to the DB table of the second storage subsystem thereby to duplicate the DB table data, and suspending the subsequent transfer of DB table data so that the DB tables of the first and second storage subsystems are in a state of matching, thereby enabling the second DBMS to refer the copied DB table in a state of matching.

The DB table data which has been overwritten to the DB table of the first storage subsystem is held in the remote copy buffer of the first storage subsystem, and the first storage subsystem transfers and copies the DB table data in the buffer to the DB table of the second storage subsystem in response to the command of duplication, thereby duplicating the DB table data.

Storage location information of the DB table for the DB table data which has been overwritten to the DB table of the first storage subsystem is stored in the memory of the first storage subsystem, and the first storage subsystem reads the location information out of the memory in response to the command of duplication and transfers and copies the DB table data in the DB table as indicated by the location information to the DB table of the second storage subsystem, thereby duplicating the DB table data.

The present invention also resides in a duplicated storage subsystem which includes a first storage subsystem having a first external storage control unit and a first external storage unit and is connected to a first processor system, and a second storage subsystem having a second external storage control unit and a second external storage unit and is connected to a second processor system, with the first and second external storage control units being connected to each other, wherein the first external storage control unit includes a means of overwriting data, which is held in a cache of the first processor system, to the first external storage unit, a means of holding the updating of the data which has been written to the first external storage unit against a subsequent request of updating, a means of transferring the-data to the second storage subsystem thereby to duplicate the data, and a means of suspending the subsequent transfer of data from the first external storage unit to the second storage subsystem, so that the data stored in the first and second storage subsystems are in a state of matching.

The first external storage control unit includes a means of storing the data which has been overwritten to the first external storage unit into a buffer of the first external storage control unit, and a means of transferring the data in the buffer to the second storage subsystem in response to the command of duplication, thereby duplicating the data.

The first external storage control unit includes a means of storing storage location information of the first external storage unit for the data which has been overwritten to the first external storage unit into a memory of the first external storage control unit, and a means of reading the location information out of the memory in response to the command of duplication and transferring the data which is stored in the first external storage unit as indicated by the location information to the second storage subsystem, thereby duplicating the data.

The first external storage control unit and the second external storage control unit are linked through an exclusive communication line to carry out the data communication.

Alternatively, the first external storage control unit and the second external storage control unit are linked through a switch or a network to carry out the data communication.

DESCRIPTION OF THE PREFERRED EMBODIMENTS

An embodiment of the present invention will be explained with reference to FIG. 1 through FIG. 6.

Figure 2:
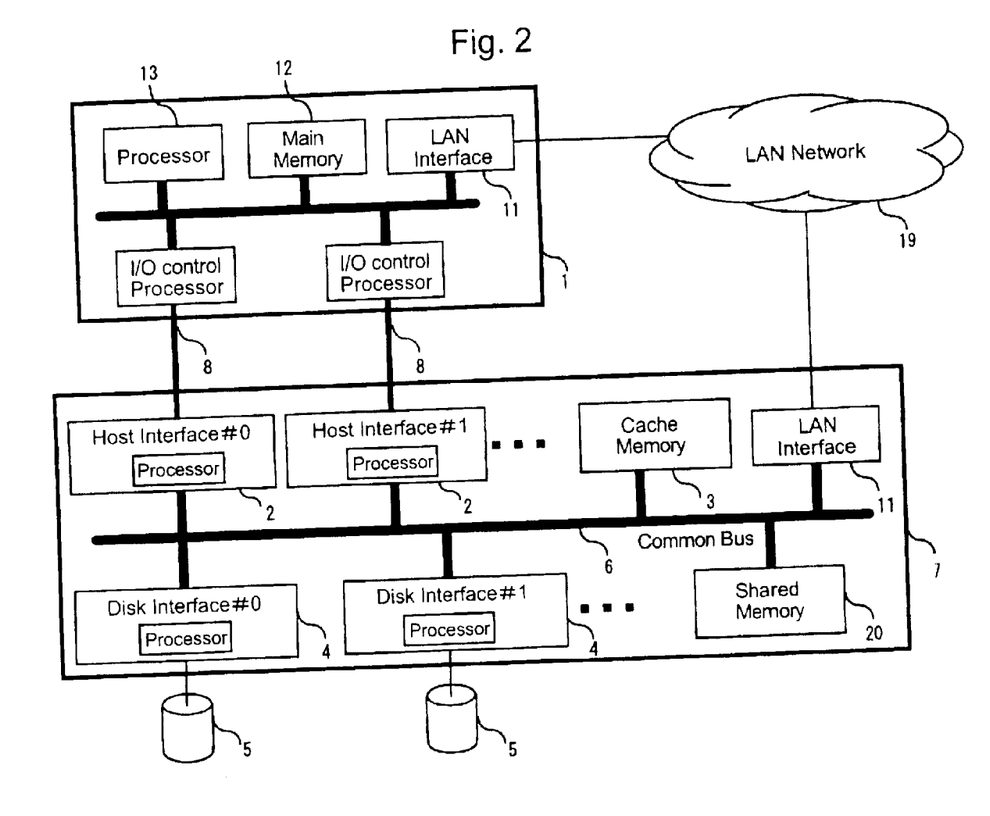
FIG. 2 is a block diagram showing an example of the arrangement of a single disk control unit which is connected to a host computer.

FIG. 2 shows an example of the arrangement of a single disk control unit which is connected to a host computer. A disk control unit 7 connected to a host computer 1 through channel paths 8 includes host interface devices 2, a cache memory 3, a shared memory 20, disk interface devices 4 for connection with disk drives 5, and a common bus 6 which connects these internal devices.

The disk control unit 7 can have multiple disk interface devices 4, and can have multiple host interface devices 2 for connection with one or more than one host computer 1. In that case, each host interfaces 2 may be connected to hosts different from each other. The embodiment shown in FIG. 2 has both host interface devices 2 connected to the same host computer 1. Each of the host interface devices 2 and disk interface devices 4 has a processor which operates autonomously.

The cache memory 3 and LAN interface 11 are common resources which can be referred by the host interface devices 2 and disk interface devices 4. The cache memory 3 temporarily stores data which is written to the disk control unit 7 and data which is read out of the disk drives 5 to the host computer 1. In case the disk control unit 7 has the disk array function, data which is sent from the host computer 1 is stored dividedly on the multiple disk drives 5. Although this embodiment is applicable to the disk array, the following explains the operation for the usual disk for the sake of simplicity of explanation.

The arrangement of a remote copy system will be explained with reference to FIG. 3. Remote copy is a function of the disk control unit 7 for copying a specified volume to other disk control unit based on the program held by the host interface device 2.

Figure 3:
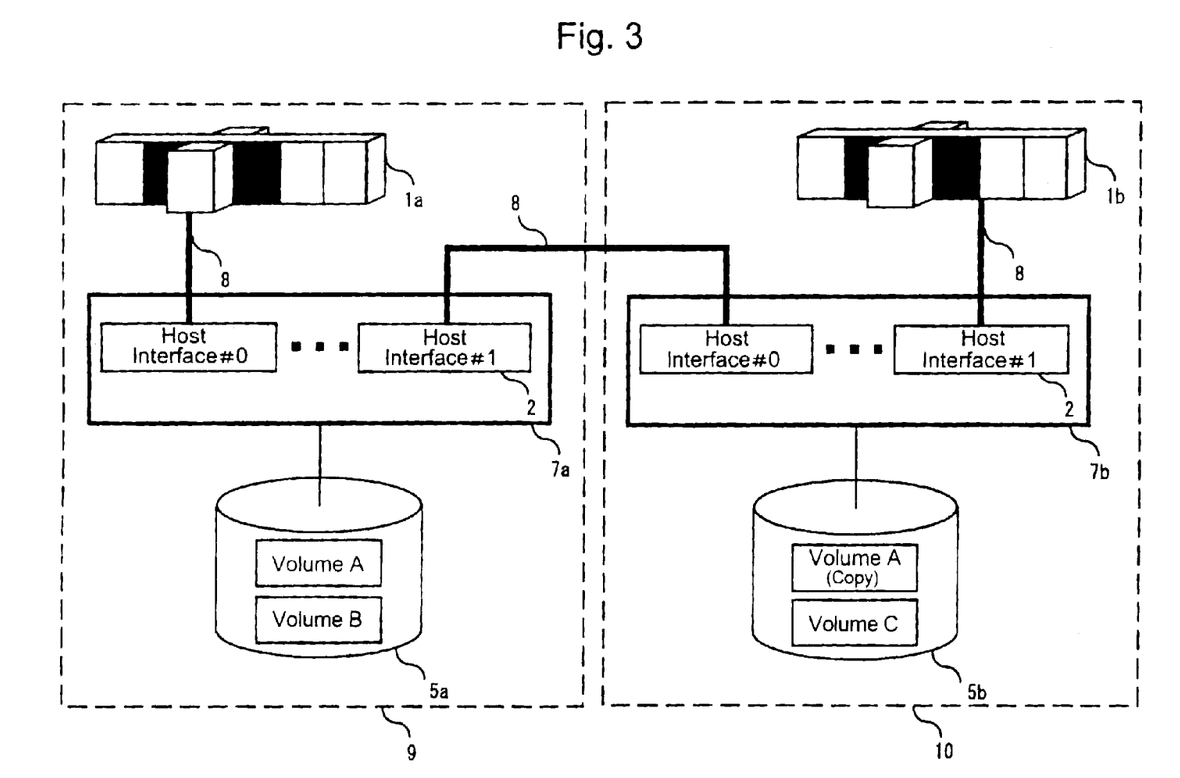
FIG. 3 is a block diagram showing an example of the arrangement of a remote copy system.

In FIG. 3, indicated by 9 is a main system, which includes a host computer 1a, a disk control unit 7a having host interface devices 2, a disk drive 5a, and channel paths 8, and indicated by 10 is a subordinate system, which includes a host computer 1b, a disk control unit 7b having host interface devices 2, a disk drive 5b, and channel paths 8. Shown in this figure is copying of volume A on the disk drive 5a of the main system 9 to the disk drive 5b of the subordinate system 10.

Although the main system 9 and subordinate system 10 are shown to have the same arrangement in FIG. 3, these systems do not need to be identical inclusive of the software design to conduct remote copy. Moreover, these systems are called the main system and subordinate system expediently, and it is not necessary for one system to be a backup system of the other. For example, the main system and subordinate system can be a trunk business system and a data ware house system, respectively. Volumes other than the volume A in FIG. 3 are the volumes of different contents used by other application programs.

The operation of remote copy is as follows. On receiving the command of writing data from the host computer 1a to the disk, the host interface #0 initially determines as to whether the volume of destination is the object of remote copy. Unless the volume is the object of remote copy, the write command is processed simply.

In case the volume is the object of remote copy, the write command is processed as usual and, at the same time, the host interface #1 issues a write command, which is identical to that given by the host computer 1a, to the disk control unit 7b. Consequently, the volume A is duplicated on the disk drive 5b of the subordinate system 10.

The host interface devices have both functions of the reception of input/output commands and the issuance of input/output commands, and these functions are accomplished by the processors in the host interface devices.

Remote copy falls into synchronized remote copy and non-synchronized remote copy depending on the manner of issuance of write command to the destination of copy. In synchronized remote copy, the disk control unit 7a of the main system 9 receives a write command from the host computer 1a, and thereafter issues the same write command to the disk control unit 7b of the subordinate system 10 and returns the acknowledgement from the disk control unit 7b to the host computer 1a. In non-synchronized remote copy, the disk control unit 7a issues the write command to the disk control unit 7b at an appropriate timing after the return of acknowledgement to the host computer 1a.

Due to these different manners of processing, synchronized remote copy and non-synchronized remote copy have the following differences in their characteristics.

In regard to the response time of write command seen from the host computer 1a, non-synchronized remote copy takes virtually the same time as the conventional operation, whereas synchronized remote copy which deals with the write command twice takes a response time which is approximately twice that of the conventional operation.

Non-synchronized remote copy, which issues the write command to the disk control unit 7b at an asynchronous timing, necessitates a buffer for holding data to be copied, and a cache memory is used for this buffer.

Starting and ending of remote copy are controlled by the program of the host computer by using commands similar to the usual input/output commands. The following explains major commands.

(1) Initialization and copy start command: This command copies the whole contents of the specified originating volume to the destination volume so that both volumes have the same contents, i.e., initialization, and starts remote copy for the write command issued by the host computer in the specified copy mode (synchronized or non-synchronized).

(2) Halt command: This command halts remote copy temporarily. Remote copy data of a subsequent write command is saved in the buffer so that remote copy can be resumed by the restart command.

(3) Restart command: This command restarts remote copy which has been halted for the remote copy data saved in the buffer.

(4) Flush command: This command forcedly copies the remote copy data, which is saved in the buffer, to the destination of copy.

Figure 4:
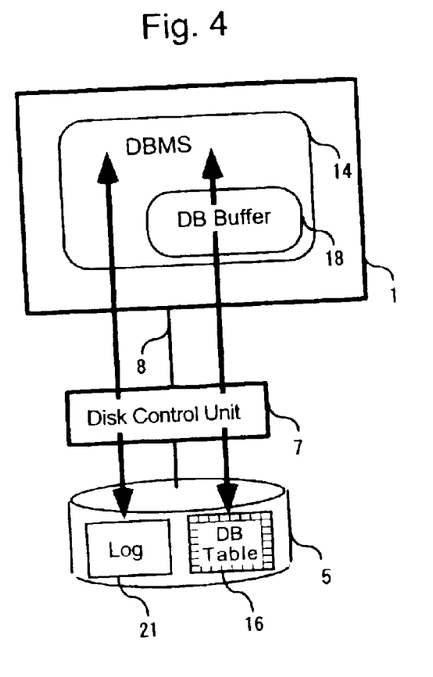
FIG. 4 is a diagram showing an example of the relation between the database system and the DB table on the disk.

FIG. 4 shows the relation between the database management system (DBMS) 14 and the DB table 16 and log file 21 on the disk 5. The DB table is data of database.

The DBMS reads the DB table via the database buffer (DB buffer) 18. The DB buffer is a cache memory, which stores data that is used recently so as to reduce the number of times of disk access thereby to speed up the process.

The log file 21 stores the content of alteration of the DB buffer 18 an DB table 16 and commission in which would be necessary for the fault recovery of the database.

The details of the function and process of DBMS are described in publication entitled "Database system and data model" written by Ryosuke Hotaka and published by Ohm.

The DB buffer 18 as cache memory is controlled based on the so-called write-back scheme. Specifically, updated data is stored in the cache memory until it is full, instead of being written to the DB table 16 on the disk immediately. Therefore, the DB table 16 on the disk does not necessarily contain the most recent data. The timing of updating of the DB table 16 is uncertain.

On this account, copied data which has been produced by remote copy of the DB table is not necessarily in a state of matching. The state of matching signifies the most recent state of data at an arbitrary timing of reference and, at the same time, the state in which the contents of DB table is certified to be unvaried during the reference.

With the intention of making the DB table 16 on the disk to be in a state of matching so that data is referred correctly at the remote copy destination, the following two functions are added to the process of the DBMS 14. One function is to forcedly write the contents of the DB buffer 18 to the DB table 16 on the disk, and it is called flushing of DB buffer. Another function is to prevent the writing of the contents of DB buffer, even if it becomes full, to the DB table 16 on the disk, and it is called DB table write suppression.

These functions are readily accomplished by a program of the DBMS 14. For example, the DB table write suppressing function is implemented by use of the log file 21. Even if writing to the DB table 16 on the disk is suppressed simply, the content of altertion of the DB table 16 is not lost since the content of alteration is recorded entirely in the log file 21. Even if updating of the DB table 16 on the disk is held temporarily, the copy originating DBMS can restore the normally updated contents by making reference to the log file 21 at an arbitrary timing.

DB buffer flushing, DB table write suppression and DB table write resumption are instructed by so-called SQL commands which are similar to the commands of usual search inquiry to the DBMS. Accordingly, these functions can be used and controlled within the host computer and by arbitrary systems which are linked to the host computer via the LAN or the like.

Figure 5:
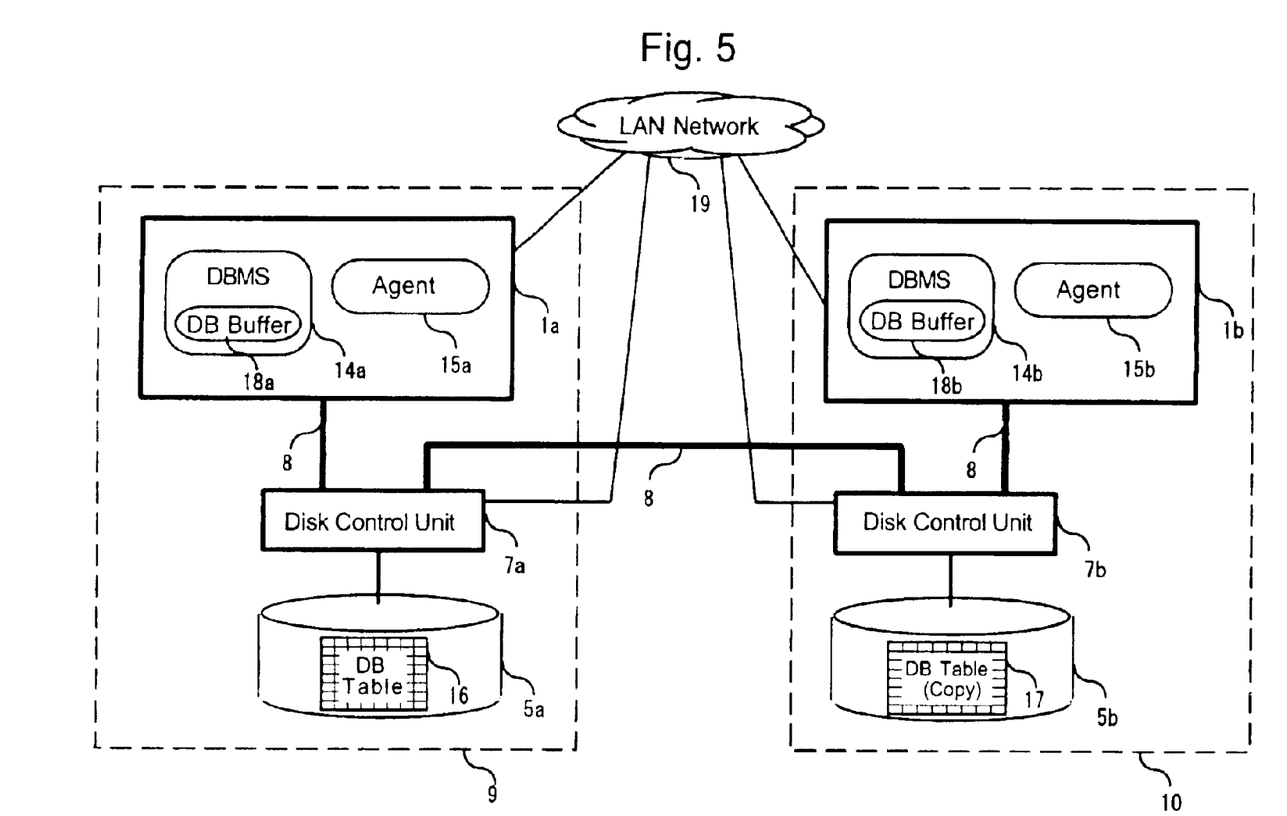
FIG. 5 is a diagram showing an example of the remote copy system of the case where the host computer has a DBMS.

FIG. 5 shows a data duplication system having DBMSs included in the host computers. Indicated by 9 is a main system and 10 is a subordinate system, which include host computers 1a and 1b, respectively, disk control units 7a and 7b, respectively, disk drives 5a and 5b, respectively, DBMSs 14a and 14b, respectively, agents 15a and 15b, respectively, DB buffers 18a and 18b, respectively, and DB tables 16 and 17, respectively. Indicated by 8 are channel paths.

Figure 1:
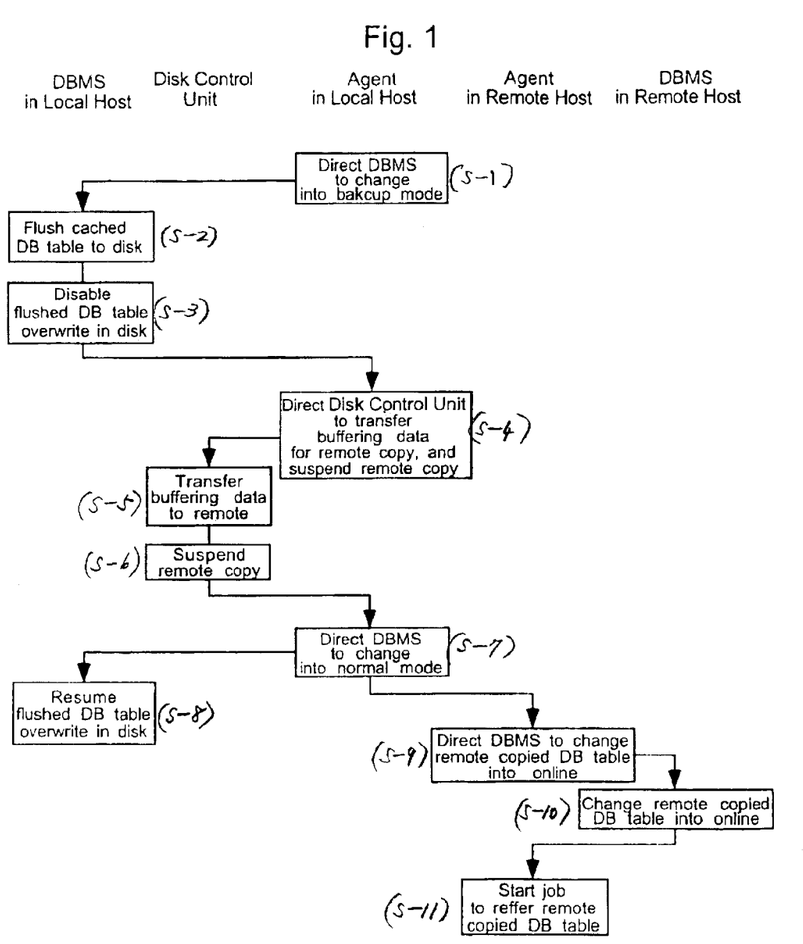
FIG. 1 is a diagram showing an example of the procedure of remote copy of a DB table in a state of matching and reference of the copied DB table on the part of a subordinate system based on the present invention.

FIG. 1 shows the procedure of remote copy of the DB table in a state of matching for reference on the part of the subordinate system in the system arrangement of FIG. 5.

The agents 15b and 15c are programs which are run by the respective host computers for controlling the DBMSs 14a and 14b and disk control units 7a and 7b.

In operation, the agent 15a of the main host computer initially issues to the DBMS 14a a command of flushing of the data in the DB buffer to the disk, and subsequently issues a command of write suppression for the DB table 16 on the disk so that the DB table 16 becomes a state of matching. These operations are identical to the procedure of putting the DBMS 16 into backup mode which is generally carried out in a state of matching in consideration of the case of data restoration.

Next, data in the remote copy buffer of the main disk control unit 7a, if there is, is transferred to the destination system so that the DB table 16 of the remote copy originating system (will be called main DB table 16) and the DB table 17 of the destination system (will be called sub DB table 17) have the same contents. This operation is needed only in the case of non-synchronized remote copy. In the case of synchronized remote copy, the operation is not necessary, because of the subordinate system to have immediately the contents written by the disk control unit 7a of the main system.

On completion of remote copy, successive remote copy is suspended so that updating of the main DB table 16 does not affect the sub DB table 17. In consequence, it becomes possible for the DBMS 14b of subordinate system to refer the contents of the DBMS 14b of an arbitrary time point.

Subsequently, the DBMS 14a is brought to normal mode by issuing a restart command for the writing to the main DB table 16, although this command issuance is not compulsory. However, halting the writing to the main DB table 16 too long time will take an excessive time for restoring the inherent contents of the main DB table 16 by use of the log file, because the number of the parts to be restored is increased.

The agent 15b of the subordinate host computer 1b is directed via the LAN network 19 to start the operation. The subordinate host computer agent 15b operates on the DBMS 14b to bring the sub DB table 17 to the on-line state. Consequently, the DBMS 14b can use the sub DB table 17.

After that, the subordinate host computer agent 15b initiates a program which refers the sub DB table 17 via the DBMS 14b, or indicates the readiness of reference. The objective of the present invention is thus attained.

It is not necessary to install the agents in both of the main system and subordinate system. The objective of the present invention can be attained by installing the agent only in the main system, for example. In this case, instruction to the DBMS 14b of the subordinate system takes place via the LAN network 19. The objective of the present invention can be attained by installing the agent in the disk control unit. In this case, the processor of the host interface in the disk control unit runs the agent program.

Figure 6:
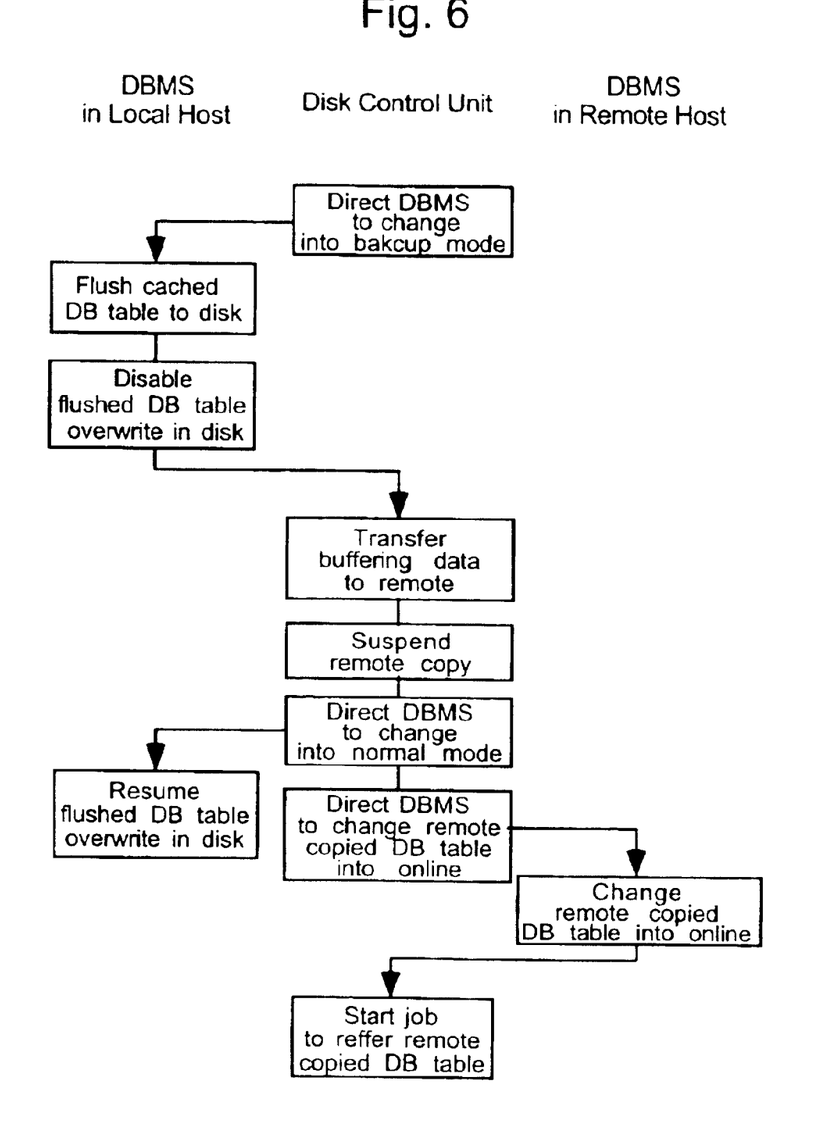
FIG. 6 is a diagram showing another example of the procedure of remote copy of a DB table in a state of matching and reference of the copied DB table on the part of a subordinate system based on the present invention.

The disk control unit, which also has the LAN interface 11, can communicate and synchronize the process with other host computer and disk control unit via the LAN network FIG. 6 shows the procedure based on this arrangement.

Figure 7:
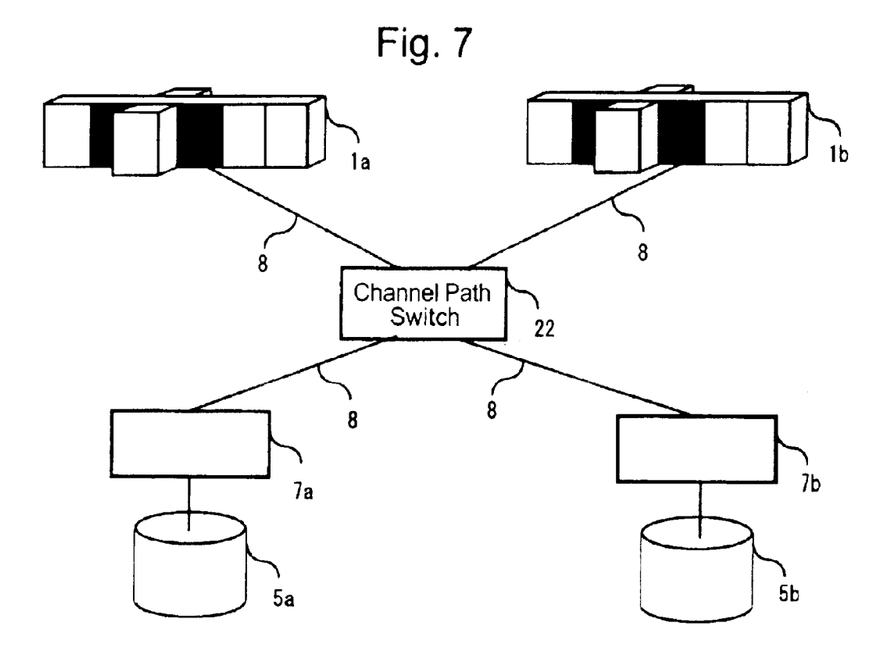
FIG. 7 is a diagram showing an example of the system arrangement in which host computers and disk control units are linked through a switch.

Although the arrangements shown in FIG. 3 and FIG. 5 are designed to perform remote copy based on the connection of the disk control units 7a and 7b through an exclusive communication line such as the channel bus 8, the present invention is also applicable to the arrangement as shown in FIG. 7 in which host computers and disk control units are linked through a switch or network to perform remote copy and data duplication.

In regard to non-synchronized remote copy of the foregoing embodiments, the cache memory in the disk control unit is used for the buffer for temporarily storing data to be written to the remote host system. However, there is another manner of data buffering as follows.

Instead of buffering data itself in the cache memory, information on the location of data on the disk (volume number, cylinder number, head number, record number, etc.) is logged. Specifically, by utilizing the fact that data is written to the volume of the originating disk control unit even if the remote copy function is active, the data location information is saved on the disk drive instead of the cache.

Figure 8:
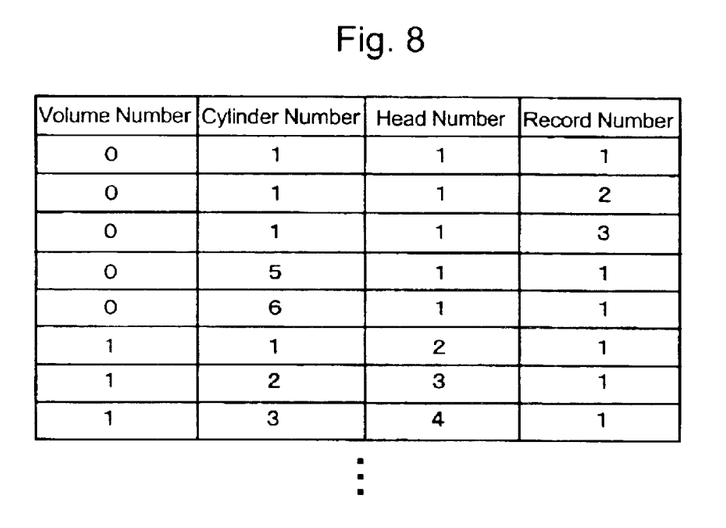
FIG. 8 is a diagram showing an example of a log table which indicates the stored location of data which undergoes remote copy.

This scheme uses log information of data as shown in FIG. 8. The log is placed in the shared memory, and has its entries produced by the host interface which has received a write request from the host computer.

In FIG. 8, the four leading-entries indicate the updating of four pieces of data from (volume number 0, cylinder number 1, head number 1, record number 1) to (volume number 0, cylinder number 1, head number 1, record number 2), to (volume number 0, cylinder number 1, head number 1, record number 3), and to (volume number 0, cylinder number 5, head number 1, record number 1).

The host interface connected to the remote host system gets the data location information by referencing the log, and it copies the data to the remote host system. The log entries which have been copied are deleted by the host interface connected to the remote host system.

By use of the log, it is possible to have the buffering of data to be copied to the remote host system based on a smaller amount of information as compared with the buffering on the cache.

Use of log also eliminate the unnecessary data transfer as shown in the following example. It is assumed that the database of the bank account is duplicated, and the database of the subordinate host computer refers data only once a day (e.g., at night). In this case, if a user takes several transactions of account within a day, account balance data is sent to the disk control unit of the subordinate host computer at each transaction. Actually, however, it is sufficient to send the last data of the day to the subordinate host computer since the subordinate database refers data only once a day.

The remaining unnecessary data transfer can be avoided based on the intermittent duplication of data by remote copy. Specifically, the cycle of suspension and resumption of remote copy is repeated at a certain time interval. A too-long copy suspension state can possibly cause the log to overflow, and therefore the suspension state is adjusted appropriately depending on the frequency of data updating by the disk control unit of the main host computer. In case the database of the subordinate host system refers data, remote copy is resumed so that the copy source and copy destination have the same contents.

In addition to the repetition of the cycle of remote copy suspension and resumption, the treatment of log is alerted as follows. During the suspension of remote copy and at the registration of the location of updated data to the log, if updating of the location is already registered in the log, the old record is deleted. In consequence, only the last data following multiple events of updating during the suspension is sent, and unnecessary data transfer between the disk control units can be avoided.

Although FIG. 5 explains the arrangement of the embodiment in which remote copy takes place between different disk control units 7a and 7b, the present invention is also applicable to the case of the copy destination within the same disk control unit, i.e., arrangement for the duplication of volume, with the phrasing of "remote copy" being replaced with "duplication" in the diagram of procedure of FIG. 1.

For the reduction of data transfer time based on the copying of DB table data, the present invention is capable of certifying the matching of DB table data of the copy destination by use of the automatic prior data duplication scheme such as the remote copy function of the disk system instead of the data file transfer by the FTP or the like. In consequence, besides the reduction of data transfer time, the matching of such as copied DB table data of the copy destination can be certified. The data extraction process in the trunk business system can be shifted to the data ware house system so that the deterioration of response of the trunk business system at the data extraction process is prevented.

What is claimed is:

1. A computer program stored on a computer readable storage medium for controlling, when executed by a computer and a storage subsystem connected to the computer to perform the steps of:

directing the computer to change into a back up mode in which the computer updates a database table stored in the storage subsystem by using data stored in the computer and stops update of the database table after updating of the database table has been completed;

directing the storage subsystem to transfer the database table to a second storage subsystem connected to the storage subsystem via a network; and directing the computer to change into a normal mode in which the computer updates the database table.

2. A computer program according to claim 1, wherein the computer program controls the computer and storage system to repeat the steps at a certain time interval.

3. A computer connected to a storage subsystem comprising:

means for changing into a back up mode in which the computer updates a database table stored in the storage subsystem by using data stored in the computer and stops update of the database table after updating of the database table has been completed;

means for directing the storage subsystem to transfer the database table to a second storage subsystem connected to the storage subsystem via a network; and means for changing into a normal mode in which the computer updates the database table.

4. A computer according to claim 3, further comprising:
   a buffer,
   wherein the buffer stores data to be used for updating the database table.

5. A computer according to claim 4, wherein the computer changes the modes repeatedly.

6. An agent program executed by a computer for controlling the computer and a storage subsystem connected to the computer, comprising:

means for directing the computer to change into a back up mode in which the computer updates a database table stored in the storage subsystem by using data stored in the computer and stops update of the database table after updating of the database table has been completed;

means for directing the storage subsystem to transfer the database table to a second storage subsystem connected to the storage subsystem via a network; and means for directing the computer to change into a normal mode in which the computer updates the database table.

7. An agent program according to claim 6, wherein the agent program is executed repeatedly.

8. A computer connected to a storage subsystem comprising:

means for changing into a back up mode in which the computer updates a database table stored in the storage subsystem by using data stored in the computer and suspends updating the database table;

means for directing the storage subsystem to transfer the database table to a second storage subsystem connected to the storage subsystem via a network; and means for changing back into a normal mode in which the computer updates the database table.

9. An agent program executed by a computer for controlling the computer and a storage subsystem connected to the computer, comprising:

means for directing the computer to change into a back up mode in which the computer updates a database table stored in the storage subsystem by using data stored in the computer and suspends updating the database table;

means for directing the storage subsystem to transfer the database table to a second storage subsystem connected to the storage subsystem via a network; and means for directing the computer to change back into a normal mode in which the computer updates the database table.

* * * * *